United States Patent

[11] 3,537,517

[72] Inventor Edward P. Doyle
Philadelphia, Pennsylvania
[21] Appl. No. 717,213
[22] Filed March 29, 1968
[45] Patented Nov. 3, 1970
[73] Assignee General Electric Company
a corporation of New York

[54] HEAT DISSIPATING ASSEMBLY
5 Claims, 3 Drawing Figs.

[52] U.S. Cl. 165/182, 165/186
[51] Int. Cl. F28f 1/30
[50] Field of Search 165/181, 182, 185, 186, 151, (Elec. Dig.), 80, 47

[56] References Cited

UNITED STATES PATENTS

| | | | |
|---|---|---|---|
| 1,920,357 | 8/1933 | Clark | |
| 1,983,549 | 12/1934 | Krackowizer | |
| 2,046,791 | 7/1936 | Przyborowski | 165/182 |
| 2,450,130 | 9/1948 | Gordon et al. | 165/182 |
| 3,004,328 | 10/1961 | Pepper et al. | 165/182 |
| 3,277,975 | 10/1966 | New et al. | |

*Primary Examiner*—Robert A. O'Leary
*Assistant Examiner*—Charles Sukal
*Attorneys*—J. Wesley Haubner, Albert S. Richardson, Jr., Frank L. Neuhauser, Oscar R. Waddell and Melvin M. Goldenberg

ABSTRACT: A stack of parallel, spaced cooling fins is mounted on the peripheral surface of a core for dissipating heat therefrom. The fins are provided with short tubular protrusions for locating and spacing purposes, and in addition each fin has a core-encompassing collar that increases the area of contact with the surface of the core but leaves room for a preformed brazing ring between it and the collar of the adjacent fin.

INVENTOR:
EDWARD P. DOYLE,
BY Albert S. Richardson Jr.
ATTORNEY

HEAT DISSIPATING ASSEMBLY

This invention relates to heat dissipating means, and more particularly it relates to improved heat sinks for semiconductor devices and the like.

Various arrangements have heretofore been proposed for cooling semiconductor devices. In one popular arrangement the device is intimately mounted on a massive copper terminal which forms a core to which are anchored a plurality of thin plates or fins having broad heat radiating surfaces, whereby heat generated by the device can be efficiently transferred to and dissipated by air flowing over and between the fins. In such a heat dissipating assembly it is important that a juncture of low thermal resistence be formed between each fin and the core. It is also important that the assembly be mechanically rugged so that these junctures are not damaged and so that the exposed edges of the relatively ductile fins are not easily bent together (thereby reducing the interfin spacing required for the passage of cooling air) by rough handling during manufacturing, shipment, or use. And in the interests of economy, the design should enable fins and core to be assembled with minimum investment in tools and labor.

Accordingly, a general objective of the present invention is to provide improved heat dissipating means of the type described characterized by relatively high efficiency and reliability and by low manufacturing costs.

In carrying out the invention in one form, a central collar and a plurality of tubular protrusions are extruded in each of a plurality of relatively thin, generally flat metal plates. The plates are stacked in parallel, spaced relation to each other on a cylindrical core with which the collars of the respective plates are in good thermal contact. The spacing between adjacent plates is determined by the tubular protrusions, and for self-locating purposes each plate is preferably provided with a plurality of circular indentations in the side opposite its protrusions to receive the distal ends of the protrusions of the adjacent plate in a nesting fashion. A gap is provided between collars of adjacent plates for a preformed brazing ring which embraces the core and ensures a strong mechanical juncture between plate and core.

My invention will be better understood and its various objects and advantages will be more fully appreciated from the following description taken in conjunction with the accompanying drawing in which.

Figure 1:
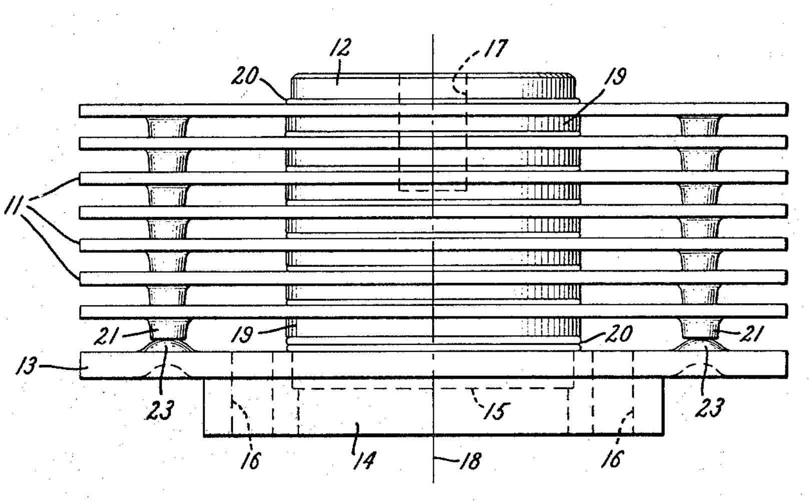
FIG. 1 is an elevational view of a heat sink embodying the invention in its preferred form.

The heat sink comprises a plurality of duplicate cooling fins 11 mounted on at least one conductive member or core 12. A relatively thick copper plate 13 is brazed to the core 12 at one end of the stack, and a steel ring 14 circumscribing the flat extremity 15 of the core is suitably attached to the external face of the plate 13. The ring 14 and plate 13 are drilled and tapped at 16 to accommodate mounting bolts for securely clamping one electrode of a semiconductor device (not shown in the drawing) firmly against the surface 15 of the core 12 in a manner like that shown in U.S. Pat. No. 2,866,928. The opposite end of the core is drilled and tapped at 17 for fastening an external electric current conductor to the heat sink. Thus the core 12 serves both as a mechanical and electrical terminal for the semiconductor device and as a thermal conductor for removing the heat that the device generates in operation. In order to mount the heat sink itself, the edges of the end plates 13 can be slotted for bolting to a suitable structural support (not shown).

The core 12 is preferably a copper or aluminum post having a peripheral surface of appreciable area. Although shown as a solid, right cylinder, alternative configurations are contemplated. For example, internally the core can be hollow, and externally it can be conical or otherwise tapered. Its cross section need not be circular, and its longitudinal dimension can be much shorter than is shown in the drawing for purposes of illustration.

The heat radiating fins 11 are preferably thin, rectangular plates of highly conductive metal such as copper or aluminum. As is clearly shown in FIG. 1, they are stacked in parallel, spaced planes generally perpendicular to the centerline 18 of the core 12. The number and size of the cooling fins and the interfin spacings that are used in practice depend on the particular cooling duty, rate of airflow, and air pressure drop specified.

Figure 3:
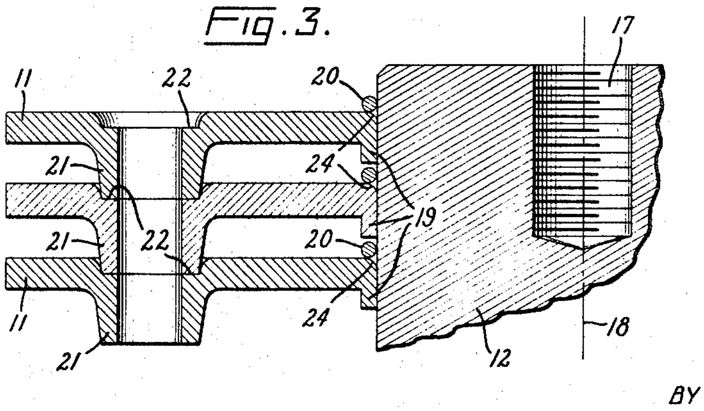
FIG. 3 is an enlarged, partial sectional view taken through lines 3–3 of FIG. 2.

Each fin 11 has an interior aperture substantially conforming to the external configuration of the corresponding section of the core 12. As is best seen in FIG. 3, this aperture is defined by an extruded collar or wall 19 which encompasses the core and is in good thermal contact with the peripheral surface thereof. In order to increase the area and consequently to lower the thermal resistance of the juncture between fin and core, the collar 19 extends in a direction parallel to the core's centerline 18 for a distance greater than the thickness of the fin, but this distance is less than the spacing between adjacent fins, whereby a gap is formed between opposing ends of the collars of adjacent fins. In each such gap there is disposed a brazing preform comprising a split ring 20 which therefore intimately embraces the core 12.

Figure 2:
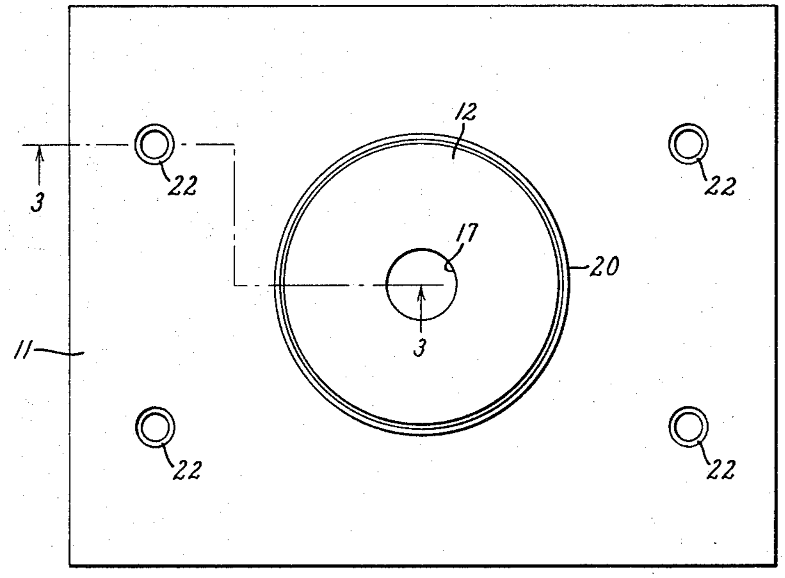
FIG. 2 is a plan view of the heat sink shown in FIG. 1.

In order to maintain a desired interfin spacing, each of the fins 11 is provided with several short protrusions or bosses 21 extending generally parallel to the centerline 18 and abutting a fin adjacent thereto. As is indicated in FIG. 2, there are preferably four duplicate protrusions per fin, each having a tubular configuration. These protrusions, which can be conveniently formed by an extruding process, are symmetrically arranged near the edges of each fin where they can effectively resist physical distortion of the relatively ductile fins due to rough handling of the assembly.

As is clearly shown in FIG. 3, the protrusions 21 are also used for angularly locating adjacent fins 11 with respect to each other. Toward this end the side of each fin opposite to its protrusions is provided with four circular, shallow indentations 22 which snugly receive the distal ends of the protrusions 21 of the adjacent fins in a nesting fashion. Preferably the respective protrusions and indentations of each fin are coaxial as shown. This arrangement ensures proper orientation of all of the fins 11 in the final assembly without requiring special fixtures or special stacking skills during the manufacturing process.

As viewed in FIG. 1, the bottom fin 11 of the assembly is spaced from and angularly located with respect to the end plate 13 by means of its protrusions 21 in cooperation with small dimples formed in the latter member. The distal ends of the tubular protrusions of the bottom fin rest on top of and are centered by the convex sides 23 of these dimples, respectively, whereby extra space is maintained between this fin and the end plate 13. The extra space will expedite the flow of cooling air at this end of the assembly which is nearest the source of heat.

After its various parts have been assembled as shown in FIG. 1, the heat sink is placed in a furnace and brazed. The integral protrusions 21 and cooperating indentations 22 assure correct positioning of all of the fins 11 on the core 12 during and after the brazing process, and no jigs or fixtures are needed for this purpose. Locating the preformed brazing rings 20 in the gaps between the collars 19 of adjacent fins assures complete alloy flow into the brazed junctures of fin and core. To further improve the reliability of such junctures, the upper edge of each collar 19 is rounded as is shown by reference number 24 in FIG. 3. Thus the interior wall of a fin 11 recedes from the peripheral surface of the core 12 in the vicinity of its upper end to form a narrow annular pocket in which braze will concentrate. This minimizes the tendency for braze to run out on the fin.

It is common practice to plate the heat sink after the brazing process is finished. The open ends of the tubular protrusions 21 prevent acids from being trapped in these protrusions during the plating process.

While I have shown and described a preferred form of my invention by way of illustrations, many modifications will undoubtedly occur to those skilled in the art. I therefore contemplate by the claims which conclude this specification to cover all such modifications as fall within the true spirit and scope of my invention.

I claim:

1. In combination:

a. a conductive member having a centerline and a peripheral surface of appreciable area;

b. a plurality of relatively thin heat-radiating metal fins mounted on the peripheral surface of said member, said fins being stacked in parallel, spaced planes that are generally perpendicular to said centerline;

c. each of said fins having a plurality of protrusions which extend generally parallel to said centerline and abut an adjacent fin to determine the spacing therebetween;

d. each of said fins also having an interior aperture substantially conforming to the exterior configuration of the corresponding section of said member;

e. said aperture being defined by a wall of the fin in good thermal contact with said surface and extending in a direction parallel to said centerline for a distance greater than the thickness of the fin but less than the spacing between adjacent fins; and f. a plurality of preformed brazing rings intimately embracing said member, each of said rings being disposed between opposing ends of the walls of a different pair of adjacent fins.

2. The combination of claim 1 in which the wall of each fin recedes from said surface in the vicinity of the upper end of the wall to form therebetween a narrow annular pocket for braze.

3. The combination of claim 1 in which said protrusions are tubular and in which each fin is provided with a plurality of circular indentations wherein the distal ends of the protrusions of the adjacent fin are snugly received in a nesting fashion.

4. In combination:

a. a conductive member having a centerline and a peripheral surface of appreciable area;

b. a plurality of relatively thin heat-radiating metal fins mounted on the peripheral surface of said member, said fins being stacked in parallel, spaced planes that are generally perpendicular to said centerline;

c. means for determining the spacing between adjacent fins comprising a plurality of hollow tubular protrusions extending generally parallel to said centerline from one side of each fin; and d. means for angularly locating adjacent fins with respect to each other comprising a plurality of circular indentations in the other side of each fin to receive the distal ends of the protrusions of the adjacent fin in a nesting fashion.

5. The combination of claim 4 in which the tubular protrusions in one side of each fin are respectively coaxial with the circular indentations in the other side of the same fin.